(12) United States Patent
Fukuzawa et al.

(10) Patent No.: US 10,746,180 B2
(45) Date of Patent: Aug. 18, 2020

(54) BLOWER DEVICE

(71) Applicant: SHINANO KENSHI CO., LTD., Ueda-shi, Nagano (JP)

(72) Inventors: Akihito Fukuzawa, Nagano (JP); Shigetoshi Tomisawa, Nagano (JP)

(73) Assignee: SHINANO KENSHI CO., LTD., Ueda (JP)

( * ) Notice: Subject to any disclaimer, the term of this patent is extended or adjusted under 35 U.S.C. 154(b) by 47 days.

(21) Appl. No.: 16/131,201

(22) Filed: Sep. 14, 2018

(65) Prior Publication Data

US 2019/0162195 A1    May 30, 2019

(30) Foreign Application Priority Data

Nov. 27, 2017  (JP) .................................. 2017-227209

(51) Int. Cl.
*F04D 25/08* (2006.01)
*F04D 29/42* (2006.01)
(Continued)

(52) U.S. Cl.
CPC .......... *F04D 25/082* (2013.01); *F04D 25/068* (2013.01); *F04D 29/541* (2013.01); *F04D 29/5813* (2013.01); *H02K 5/20* (2013.01); *H02K 9/06* (2013.01); *H02K 11/33* (2016.01); *F04D 25/0613* (2013.01); *F05B 2240/14* (2013.01); *F05B 2260/2241* (2013.01)

(58) Field of Classification Search
CPC .... F04D 25/082; F04D 29/5813; F04D 29/54; F04D 29/541; F05B 2240/14; H02K 5/20; H02K 5/10; H02K 11/33
See application file for complete search history.

(56) References Cited

U.S. PATENT DOCUMENTS 5,217,353 A * 6/1993 De Filippis ........... F04D 25/082
                                                    417/354
5,588,814 A * 12/1996 De Filippis ......... F04D 25/0613
                                                    417/423.12
(Continued)

FOREIGN PATENT DOCUMENTS

JP    H01-147659 U    10/1989
JP    2009-002209 A    1/2009
(Continued)

OTHER PUBLICATIONS

Mar. 18, 2019 Extended Search Report issued in European Patent Application No. 18194868.8.
(Continued)

*Primary Examiner* — Eldon T Brockman
*Assistant Examiner* — Wesley Le Fisher
(74) *Attorney, Agent, or Firm* — Oliff PLC

(57) ABSTRACT

A blower device includes: a fan; a motor rotating the fan; a case supporting the motor; and a heat generating component housed in the case, wherein the case includes: a main body member defining a flow path portion that guides blown air, generated by rotation of the fan, to the heat generating component; and a closing member closing an opening formed on the flow path portion, the main body member includes a fixing portion provided on the flow path portion and fixing the closing member, and the fixing portion is located inside an inner peripheral edge of the opening.

2 Claims, 5 Drawing Sheets

(51) Int. Cl.
H02K 9/06 (2006.01)
H02K 5/20 (2006.01)
F04D 29/54 (2006.01)
H02K 11/33 (2016.01)
F04D 25/06 (2006.01)
F04D 29/58 (2006.01)

(56) References Cited

U.S. PATENT DOCUMENTS

| | | | | |
|---|---|---|---|---|
| 6,107,708 | A * | 8/2000 | Yamaguchi | B60H 1/00457 |
| | | | | 310/58 |
| 6,297,572 | B1 * | 10/2001 | Sunaga | F04D 25/0613 |
| | | | | 310/68 R |
| 2008/0304986 | A1 * | 12/2008 | Kenyon | A61M 16/0066 |
| | | | | 417/423.12 |
| 2008/0317586 | A1 * | 12/2008 | Kuma | F04D 25/082 |
| | | | | 415/119 |
| 2012/0234000 | A1 * | 9/2012 | Browne | F03G 7/065 |
| | | | | 60/527 |
| 2014/0046412 | A1 * | 2/2014 | Officier | A61F 7/0085 |
| | | | | 607/107 |
| 2015/0004018 | A1 | 1/2015 | Le | |
| 2016/0153460 | A1 | 6/2016 | Okabe | |
| 2017/0110932 | A1 * | 4/2017 | Berkouk | F04D 29/668 |
| 2017/0248147 | A1 | 8/2017 | Ueda | |
| 2018/0023580 | A1 * | 1/2018 | Ishizaki | F04D 25/082 |
| 2018/0226856 | A1 * | 8/2018 | Ueda | H02K 3/522 |

FOREIGN PATENT DOCUMENTS

| | | |
|---|---|---|
| JP | 2015-017564 A | 1/2015 |
| JP | 2017-155632 A | 9/2017 |
| WO | 00/54996 A1 | 9/2000 |
| WO | 2011/110468 A1 | 9/2011 |

OTHER PUBLICATIONS

Sep. 3, 2019 Office Action issued in Japanese Patent Application No. 2017-227209.

* cited by examiner

US 10,746,180 B2

BLOWER DEVICE

CROSS-REFERENCE TO RELATED APPLICATION

This application is based upon and claims the benefit of priority of the prior Japanese Patent Application No. 2017-227209, filed on Nov. 27, 2017, the entire contents of which are incorporated herein by reference.

BACKGROUND

(i) Technical Field

The present invention relates to a blower device.

(ii) Related Art

There is known a blower device equipped with a fan. In the blower device, the blown air generated by the rotation of the fan is partially used for cooling a heat generating component provided in the blower device (see, for example, Japanese Unexamined Patent Application Publication No. 2015-017564).

SUMMARY

According to an aspect of the present invention, there is provided a blower device including: a fan; a motor rotating the fan; a case supporting the motor; and a heat generating component housed in the case, wherein the case includes: a main body member defining a flow path portion that guides blown air, generated by rotation of the fan, to the heat generating component; and a closing member closing an opening formed on the flow path portion, the main body member includes a fixing portion provided on the flow path portion and fixing the closing member, and the fixing portion is located inside an inner peripheral edge of the opening.

DETAILED DESCRIPTION

Figure 1:
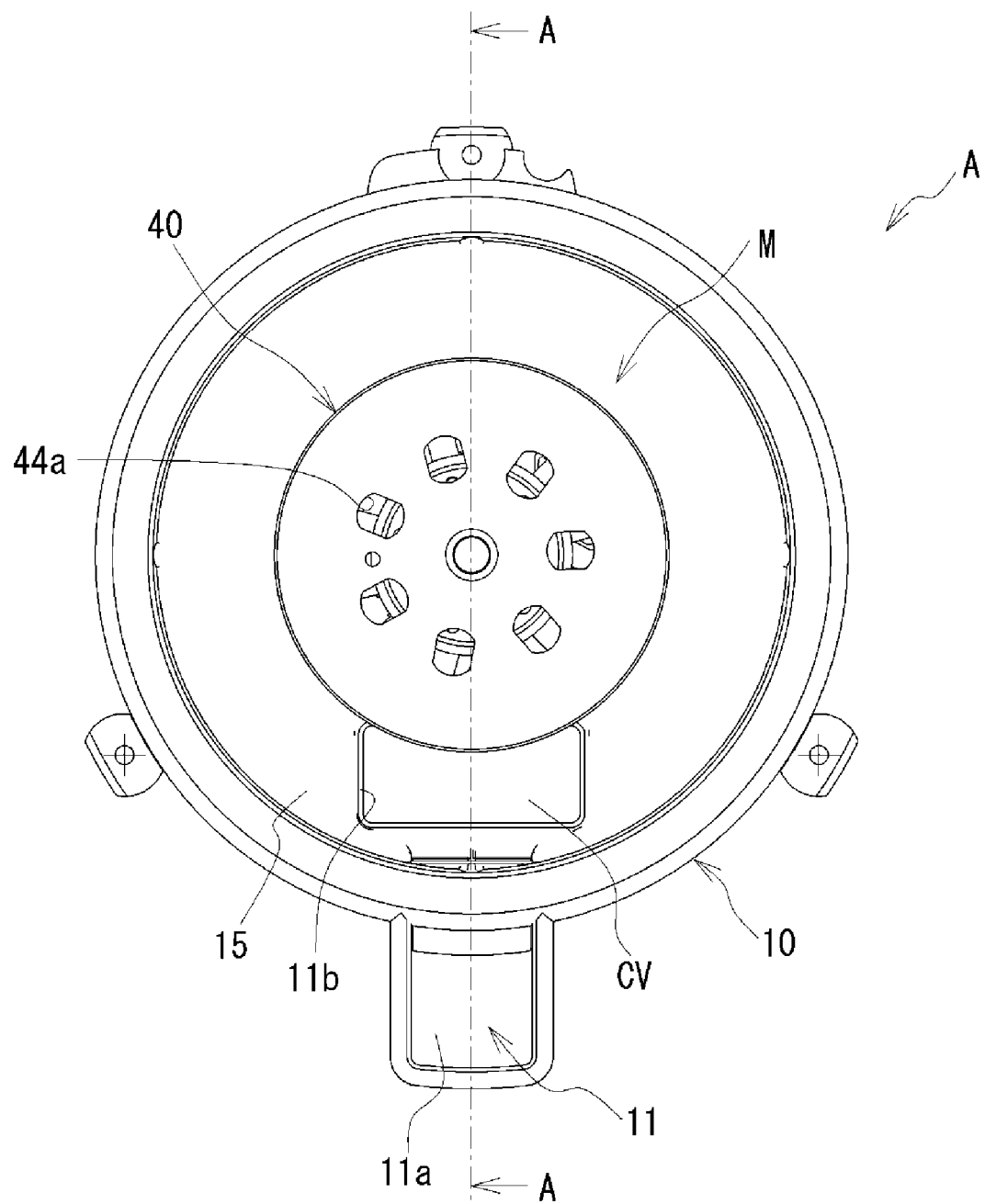
FIG. 1 is an external view of a blower device according to the present embodiment.
Figure 2:
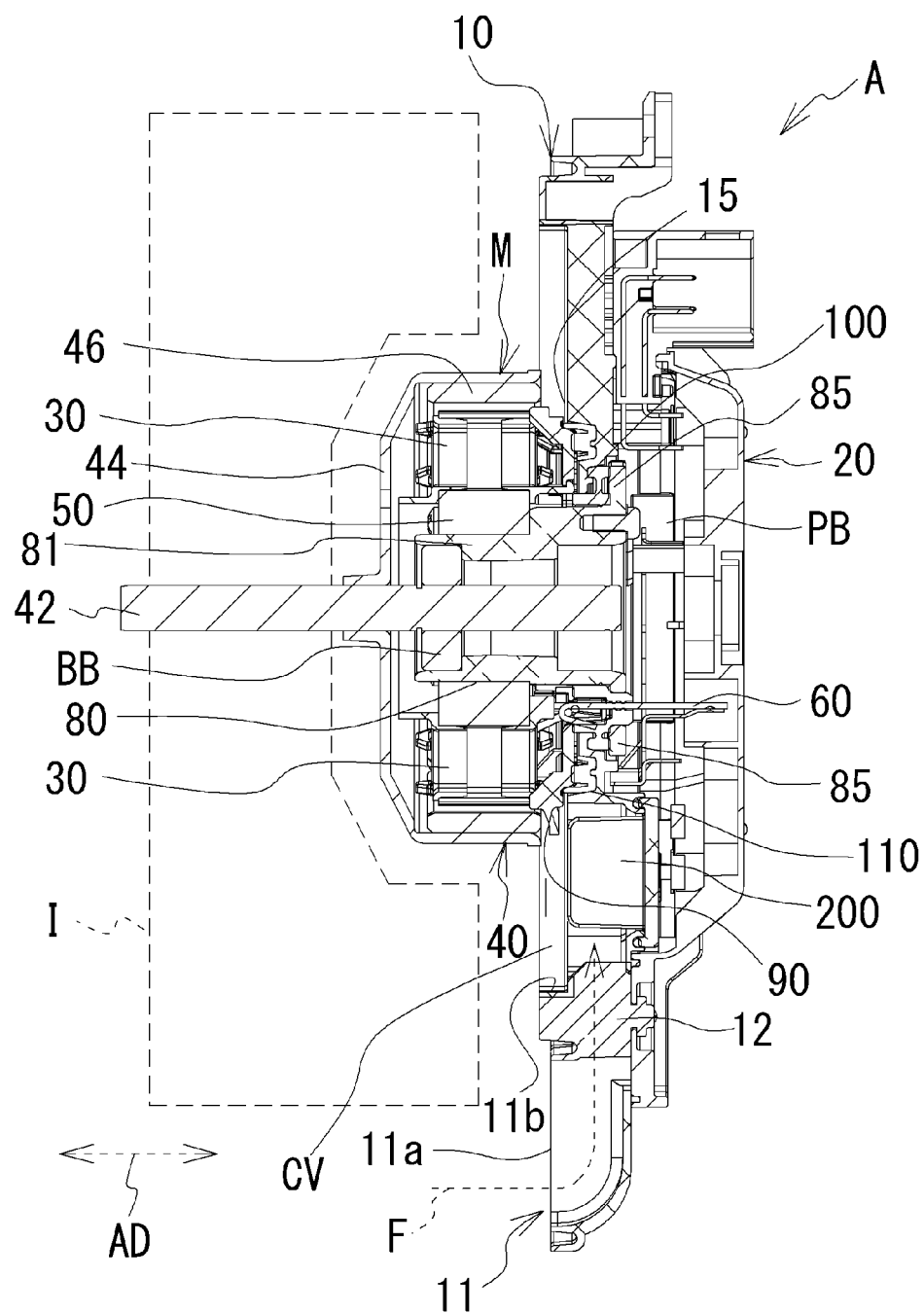
FIG. 2 is a cross-sectional view taken along line A-A of FIG. 1.

FIG. 1 is an external view of a blower device A according to the present embodiment. FIG. 2 is a cross-sectional view taken along line A-A of FIG. 1. The blower device A includes an upper case (hereinafter, simply referred to as case) 10 and a lower case (hereinafter, simply referred to as case) 20, a motor M, a fan I rotated by the motor M, a printed circuit board PB electrically connected to the motor M, and the like. Additionally, the fan I is illustrated only in FIG. 2, and is omitted in the other drawings. The motor M and the fan I are positioned on one side with respect to the case 10. A case 20 is attached to the other side of the case 10. The cases 10 and 20, each formed into a semi-casing shape, are assembled into each other to house the printed circuit board PB and electrical components. The cases 10 and 20 are made of, but not limited to, a synthetic resin, and may be made of a metal.

The case 10 is formed with a flow path portion 11 for guiding air, blown by rotation of the fan I, to a heat sink 200 that is made of metal and is thermally connected to the printed circuit board PB. An inlet 11a and an opening 11b of the flow path portion 11 face the fan I. A cover CV is provided not to expose the heat sink 200 from the opening 11b. By removing the cover CV from the opening 11b, the maintenance work of the heat sink 200 becomes easy. The blown air generated by the rotation of the fan I flows from the inlet 11a into the flow path 11 through the heat sink 200, and is discharged from the opening 11b toward the fan I. In FIG. 2, an arrow indicates a flow direction F of the blown air through the flow path portion 11. In this manner, heat dissipation of the heat sink 200 is promoted by the rotation of the fan I, which ensures the cooling property of the printed circuit board PB. The heat sink 200 is an example of a heat generating component. A fixing portion 12 to be described later in detail is provided on the flow path portion 11.

The motor M will be described. As illustrated in FIG. 2, the motor M is positioned between the fan I and the case 10. The motor M includes coils 30, a rotor 40, a stator 50, a housing 80, a cover 90, and the like. The stator 50, made of a metal, will be described later in detail. The coils 30 are wound around respective teeth portions of the stator 50. The coils 30 are electrically connected to the printed circuit board PB via terminals 60 which are not electrically connected to and is supported by the stator 50. Parts for controlling the energization states of the coils 30 are mounted on the printed circuit board PB.

The rotor 40 includes a rotational shaft 42, a yoke 44, and one or more permanent magnets 46. The rotational shaft 42, penetrating through the housing 80, is rotatably supported. Specifically, the rotational shaft 42 is rotatably supported by a bearing B held in the housing 80. The yoke 44, made of a metal having a substantially cylindrical shape, is fixed to the rotational shaft 42 outside the housing 80. The housing 80 includes: a cylindrical portion 81 having a substantially cylindrical shape; and a flange portion 85 having a disk shape, having an outer diameter larger than that of the cylindrical portion 81, and positioned at an end portion of the cylindrical portion 81 near the printed circuit board PB. The flange portion 85 is formed with receiving holes through which the respective terminals 60 penetrate. One or more permanent magnets 46 are fixed to an inner circumferential surface of the yoke 44. Additionally, the yoke 44 is provided with vent holes 44a around the rotational shaft 42, thereby promoting heat dissipation of the motor M. The permanent magnets 46 face an outer side of the teeth portions of the stator 50. When the coils 30 are energized to excite the teeth portions of the stator 50, the magnetic attractive force and the magnetic repulsive force are exerted between the permanent magnets 46 and the teeth portions, whereby the yoke 44, that is, the rotor 40 rotates relative to the stator 50. In such a manner, the motor M is an outer rotor type motor in which the rotor 40 rotates.

An opening is formed substantially at the center of the case 10. The housing 80 is disposed so as to penetrate this opening. Specifically, the flange portion 85 of the housing 80 is positioned within the cases 10 and 20 near the printed circuit board PB side, and the cylindrical portion 81 is arranged to protrude outward from the opening. Between the cover 90 and a peripheral wall portion 15 of the case 10 located around the opening, a rubber member 110 having a substantially annular shape is arranged in a compressed state in an axial direction AD. Between the flange portion 85 of the housing 80 and the peripheral wall portion 15, and between the flange portion 85 and the cover 90, a rubber member 100 having a substantially annular shape is arranged in a compressed state in the axial direction AD. The rubber member 100 is arranged substantially concentrically with the rubber member 110. The outer diameter of the rubber member 100 is smaller than that of the rubber member 110. Since the rubber members 100 and 110 are compressed in the axial direction AD, gaps are sealed by the elastic restoring forces thereof, so that dustproofness, waterproofness and vibration-proofness are ensured.

Figure 3:
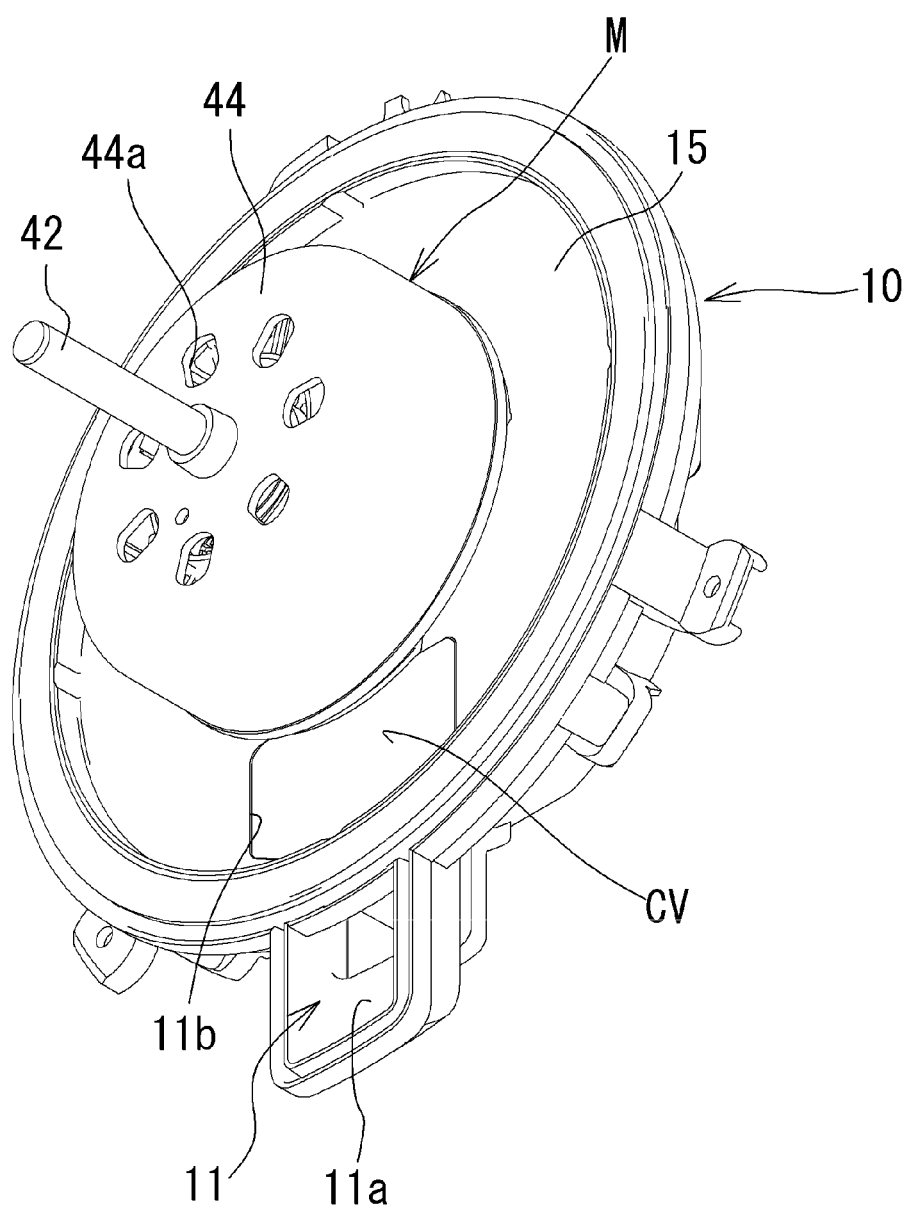
FIG. 3 is a perspective view of a lower case from which an upper case is removed.
Figure 4:
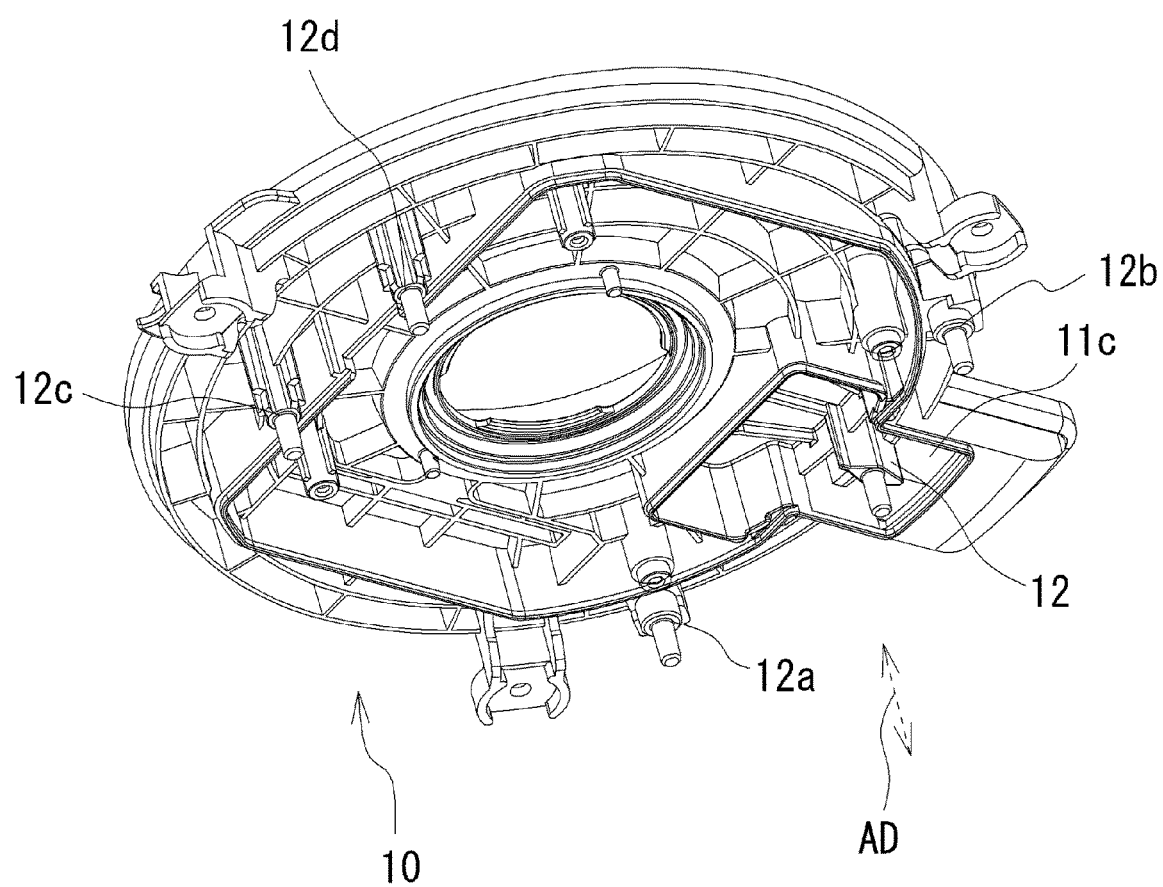
FIG. 4 is a perspective view of the lower case from which the upper case is removed.

Next, the flow path portion 11 will be described. FIGS. 3 and 4 are perspective views of the case 10 from which the case 20 is removed. As illustrated in FIG. 4, the case 10 includes fixing portions 12 to 12*d* formed on the outer peripheral side thereof. The fixing portions 12 to 12*d* are for fixing the case 20 to the case 10 by thermal caulking. Each of the fixing portions 12 to 12*d* is formed with a protruding portion for thermal caulking. The case 20 is fixed to the case 10 as follows. Hole portions are formed in the case 20 so as to correspond to the protruding portions of the fixing portions 12 to 12*d*, respectively. In a state where the respective protruding portions of the fixing portions 12 to 12*d* are inserted into the respective hole portions of the case 20, ends of the protrusions protruding from the hole portions of the case 20 are heated and melt so as to make the respective ends larger than respective diameters of the hole portions of the case 20. Thus, the case 20 is fixed to the case 10.

As illustrated in FIG. 4, an opening 11*c* is formed on the flow path portion 11. The opening 11*c* is formed due to the restriction of dies for forming the case 10. The opening 11*c* is closed by a part of the case 20 when the case 20 is fixed to the case 10 as described above. Therefore, the flow path portion 11 is cooperatively defined by the cases 10 and 20. The case 10 is an example of a main body member. The case 20 is an example of a closing member. The above-described fixing portion 12 is exposed from a substantial center of the opening 11*c*. The fixing portion 12 has a columnar shape extending in the axial direction AD.

Figure 5:
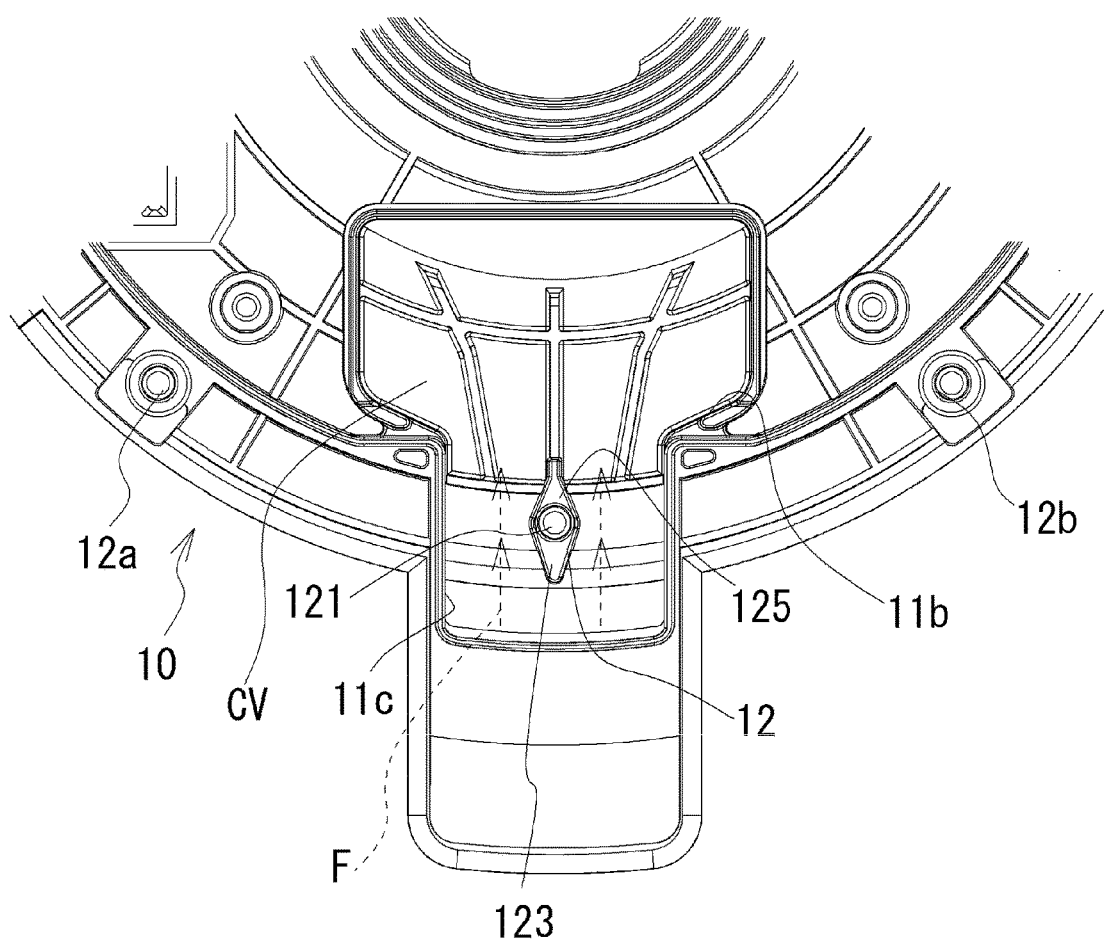
FIG. 5 is an enlarged view around a fixing portion.

FIG. 5 is an enlarged view around the fixing portion 12. The fixing portion 12 is provided at a position surrounded by the inner peripheral edge portion of the opening 11*c*. When the fixing portion 12 is viewed in the direction in which the fixing portion 12 extends, a longitudinal direction of a shape of the fixing portion 12 is a flow direction F of the blown air in the flow path portion 11, and a short direction of the shape of the fixing portion 12 is orthogonal to the flow direction F. Specifically, the fixing portion 12 includes: a protruding portion 121 having a pin shape and protruding in the axial direction AD; an upstream-side tapered portion 123 located on the upstream side of the protruding portion 121 in the flow direction F; and a downstream-side tapered portion 125 located on the downstream side in the flow direction F. The protruding portion 121 is inserted into a hole portion of the case 20 provided at the corresponding position of the protruding portion 121, and an end of the protruding portion 121 is melted and then cured, thereby fixing the case 10 and the case 20 to each other. That is, the protruding portion 121 serves as a pin for thermal caulking. The protruding portion 121 is positioned substantially at the center of the opening 11*c*. The thickness of the upstream-side tapered portion 123 in the direction orthogonal to the flow direction F gradually decreases toward the upstream side in the flow direction F. Likewise, the thickness of the downstream-side tapered portion 125 in the direction orthogonal to the flow direction F gradually decreases toward the downstream side in the flow direction F. The thickness of each end of the upstream-side tapered portion 123 and the downstream-side tapered portion 125 is smaller than the diameter of the protruding portion 121.

As described above, the fixing portion 12 is formed at a position surrounded by the inner peripheral edge of the opening 11*c*. This suppresses a gap between the opening 11*c* and the case 20, in a case where a part of the case 20 is fixed to the fixing portion 12 so as to close the opening 11*c*. It is therefore possible to suppress air leakage and an increase in noise caused by the air leakage.

This also eliminates the need for fixing the cases 10 and 20 at a plurality of locations around the opening 11*c* in order to suppress the gap between the opening 11*c* and the case 20. Thus, the assembling workability of the cases 10 and 20 is improved.

As described above, the longitudinal direction of the shape of the fixing portion 12 is the flow direction F, and the fixing portion 12 includes the upstream-side tapered portion 123 and the downstream-side tapered portion 125. As a result, in the case where the fixing portion 12 is formed on the flow path portion 11, the pressure loss of the air flowing through the flow path portion 11 is suppressed, which effectively promotes the heat dissipation of the heat sink 200.

As illustrated in FIG. 4, the fixing portions 12, 12*a*, and 12*b* are located on substantially the same circular arc line. It is therefore possible to stably fix the cases 10 and 20.

While the exemplary embodiments of the present invention have been illustrated in detail, the present invention is not limited to the above-mentioned embodiments, and other embodiments, variations and modifications may be made without departing from the scope of the present invention.

In the above embodiment, the heat sink 200 is described as an example of the heat generating component, but the heat generating component is not limited thereto. For example, the heat generating component may be any component that generates heat in accordance with supplied electric power. Instead of the heat sink 200, the heat generating component may be, for example, a coil, a terminal of a motor, or an electronic component mounted on a printed circuit board.

In the above embodiment, the protruding portion 121 is located substantially at the center of the opening 11*c*, but it is not limited to this. Each position of the fixing portion 12 and the protruding portion 121 may be set a position distant from the center of the opening 11*c*, in accordance with the position, size, and shape of the heat generating component. However, from the viewpoint of suppressing the above-described air leakage, it is preferable that the positions of the fixing portion 12 and the protruding portion 121 are close to the center of the opening 11*c*.

The method of fixing the case 20 to the fixing portion 12 so as to close the opening 11*c* is not limited to the above-described thermal caulking. For example, they may be fixed by screwing, snap fitting, riveting or the like. In the case of using screwing, rivets or the like, the above-described protruding portion 121 corresponds to a hole portion into which a screw or a rivet is inserted.

What is claimed is:

1. A blower device comprising:
   a fan;
   a motor rotating the fan;
   a case supporting the motor; and
   a heat generating component housed in the case,
   wherein
   the case includes:

a main body member defining a flow path portion that guides blown air, generated by rotation of the fan, to the heat generating component; and a closing member closing an opening formed on the flow path portion, the main body member includes a fixing portion provided on the flow path portion and fixing the closing member, and the fixing portion is located inside an inner peripheral edge of the opening, the fixing portion has a columnar shape extending toward the opening, and when the fixing portion is viewed in a direction in which the fixing portion extends, a longitudinal direction of a shape of the fixing portion is a flowing direction of the blown air in the flow path portion, and a short direction of the shape of the fixing portion is orthogonal to the flowing direction, and the fixing portion includes an upstream-side tapered portion and a downstream-side tapered portion, the upstream-side tapered portion and the downstream-side tapered portion being located at an upstream side and a downstream side of the flowing direction, respectively, the upstream-side tapered portion having a thickness in a direction orthogonal to the flowing direction gradually decreasing toward the upstream side of the flowing direction, the downstream-side tapered portion having a thickness in a direction orthogonal to the flowing direction gradually decreasing toward the downstream side of the flowing direction.

2. The blower device of claim 1, wherein the closing member houses the heat generating component together with the main body member.

* * * * *